United States Patent [19]

Bomse et al.

[11] Patent Number: 5,015,848
[45] Date of Patent: May 14, 1991

[54] MASS SPECTROSCOPIC APPARATUS AND METHOD

[75] Inventors: David S. Bomse; Joel A. Silver; Stanton: Alan C., all of Santa Fe, N. Mex.

[73] Assignee: Southwest Sciences, Incorporated, Santa Fe, N. Mex.

[21] Appl. No.: 421,281

[22] Filed: Oct. 13, 1989

[51] Int. Cl.$^5$ .................................. B01D 59/44
[52] U.S. Cl. ................... 250/281; 250/282; 250/286; 250/288
[58] Field of Search ............... 250/281, 282, 286, 288

[56] References Cited

U.S. PATENT DOCUMENTS

| | | | |
|---|---|---|---|
| 3,548,188 | 12/1970 | Nemeth | 250/41.9 |
| 3,796,872 | 3/1974 | Merren | 250/283 |
| 4,149,077 | 4/1979 | Yamashita et al. | 250/282 |
| 4,170,736 | 10/1979 | Wessel | 250/423 P |
| 4,209,697 | 6/1980 | Renner et al. | 250/282 |
| 4,217,494 | 8/1980 | Levy | 250/281 |
| 4,433,241 | 2/1984 | Boesl et al. | 250/282 |
| 4,755,670 | 7/1988 | Syka et al. | 250/282 |
| 4,855,593 | 8/1989 | Bodenhausen et al. | 250/282 |

Primary Examiner—Jack I. Berman
Assistant Examiner—Kiet T. Nguyen
Attorney, Agent, or Firm—Robert W. Weig; Deborah A. Peacock; William A. Elkund

[57] ABSTRACT

The disclosure is directed to a method and apparatus for ionization modulated mass spectrometric analysis. Analog or digital data acquisition and processing can be used. Ions from a time variant source are detected and quantified. The quantified ion output is analyzed using a computer to provide a two-dimensional representation of at least one component present within an analyte.

34 Claims, 5 Drawing Sheets

MASS SPECTROSCOPIC APPARATUS AND METHOD

FIELD OF THE INVENTION

The invention relates to ionization modulated mass spectrometry and more particularly to a method and apparatus for providing two-dimensional mass spectroscopic information representative of at least one component present within an analyte.

BACKGROUND OF THE INVENTION

Mass spectrometers constitute a class of instruments for analysis of elements, compounds and mixtures. Mass spectrometers are often called "universal detectors" because every known species exhibits a mass spectrum. Mass spectrometry has clear benefits, but is often not effective in identifying components of mixtures nor in providing sufficient information to distinguish among similar materials. The improved mass spectrometer apparatus and method of the invention provides additional information which, used in conjunction with the standard mass spectra, allows one to distinguish spectra of similar materials and makes possible the identification of the components of a sampled mixture without requiring separation of the mixture components prior to mass spectral analysis. Utilizing the apparatus and method of the invention in mass spectrometers can additionally significantly lower detection and analysis costs.

A typical mass spectrometer comprises three sections: an ionizer, a mass filter and an ion detector. The ionizer converts some portion of the analyzed material, usually referred to as the analyte, into gaseous ions. The mass filter disperses the ions according to mass and the ion detector measures the flux or concentration of ions transmitted by the mass filter. A variety of devices exists at present to implement each of the three spectrometer sections. Some discussion of ionizers follows in sufficient detail to explain their operation in accordance with the invention.

Electron impact ionizers are the most commonly used ionizers in mass spectrometers. In them, electrons boil off a metal filament and accelerate to some nominal voltage to form ions by collisions with the analyte. Key ionizer performance characteristics are the nominal electron energy, the energy resolution, i.e., the width of the distribution of electron energies about the nominal value, and the magnitude of the electron beam current. Other ionization devices employ light, e.g., photoionization including multiple photon and multiple color processes; ion beams, e.g., secondary ionization mass spectroscopy (SIMS); high speed atoms, e.g., fast atom bombardment (FAB); a hot filament, e.g., surface ionization; strong electric fields, e.g., field ionization; or radioactive decay.

It is well known to those skilled in the art that variations in ionization conditions can cause major changes in the number and identity of the ions formed from a given analyte. For example, increasing the kinetic energy of electrons in an electron impact ionizer typically increases the total amount of ions produced and also leads to a larger variety of ions formed from molecular precursors. Different types of ions are generated because the ionization process, at higher energies, can also break chemical bonds, thereby forming ionized fragments of the molecular precursor. The distribution of fragment ion intensities can provide useful information that may help identify the analyte, but a plethora of fragment ions may also obscure ions due to the other precursor species in the analyte.

Much of the prior art in mass spectrometry consists of devices for identifying one or more components within a mixture or for providing additional useful information to aid species identification. Some prior art mixture analysis devices cause physical separation of the mixture components before ionization. Examples of such devices are chromatographic devices, such as gas chromatography devices, and devices providing selective desorption from a body, such as disclosed in U.S. Pat. No. 3,548,188, to Nemeth, and the molecular beam time-of-flight device. A different approach to mixture analysis measures the mass distribution of fragment ions generated by intentional decomposition of selected ions found in the mass spectrum of the mixture. Ion decomposition can be effected by collisions with a buffer gas or by the action of light on the ions. Ion fragmentation methods have been described as "taking a mass spectrum of a mass spectrum." Such techniques are often referred to as tandem mass spectrometry or as "MS/MS."

Other prior art devices used for mass spectral analysis of mixtures make use of selective ionization of a target species within a mixture or ionization of a subset of species present including the target species. For example, a prior art device utilizing photoionization via multiple photon absorption, which may also include absorption of light at more than one discrete wavelength for trace vapor detection, is disclosed in U.S. Pat. No. 4,170,736, to Wessel. U.S. Pat. No. 4,433,241, to Boesl, et al., discloses a method and apparatus for determining molecular spectra, and U.S. Pat. No. 4,217,494, to Levy, discloses a method and apparatus for isotope separation. In each of these three patents, the quantity and identity of ions formed is sensitive to relatively small changes in the wavelengths of the photoionization light sources, and the values of the wavelengths used comprise a major part, if not all, of the pertinent experimental conditions.

Some instruments contain a subset of the three components, the ionizer, the mass filter, and the ion detector, that make up a typical mass spectrometer. For example, vacuum ionization gauges, consisting of an electron impact ionizer and a simple cage ion collector, are used to measure gas pressures under high vacuum ($10^{-3}$–$10^{-8}$ torr) conditions. Flame ionization detectors for gas chromatography record the instantaneous concentration of ions produced in chromatograph effluent by a high temperature flame. Small, fixed-mass mass spectrometers are used as leak detectors; only helium ions are transmitted to the ion detector.

The present invention has greater generality and wider applicability than the devices and methods of the prior art as represented by the aforementioned photoionization patents. For example, U.S. Pat. No. 4,170,736, to Wessel, discloses a two color photoionization mechanism which is useful for predetermined gaseous molecules and in which the first and second laser wavelengths are both, for at least some portion of the measurement time, at wavelengths corresponding to known energy transitions within the target molecules. Photoionization, in accordance with the present invention, requires no such restrictions on the correspondence between the light wavelengths and any optical properties of the molecules. Non-resonant excitation mechanisms, including direct single photon photoionization, are effective. The invention also is not limited to measurements of predetermined species, even though the preferred embodiment discusses the use of reference spectra of known materials for mixture deconvolution. The invention also applies to measurements of novel, previously unknown species, and provides a mechanism for characterizing such species which generates more useful information than does conventional mass spectroscopy.

The invention also has greater generality than the laser photoionization patent, U.S. Pat. No. 4,433,241, to Boesl, et al. Although this patent discusses generating two-dimensional mass spectra, i.e., ion intensities as a function of both mass and laser wavelength, as with the Wessel patent, it is important to select laser wavelengths coincident with optical transition resonances of the target atoms or molecules. The Levy patent is limited to isotope separation. Levy places restrictions on the allowed wavelengths and wavelength ranges which make his device useful for isotope separation where wavelength specifications are much more restrictive than in practicing the instant invention.

U.S. Pat. No. 3,796,872, to Merren, describes a device for concurrent accumulation of more information than is available from conventional mass spectrometers through the use of plural ion beams, each generated by a different ionizer and each striking a different detector. His ionizers produce a fixed, steady output during the operation of his device.

In embodiments appropriate to cases in which the analyte can be characterized adequately by the response of the total ion signal to time variant ionization, the method and apparatus need not include mass filtration or analysis of the ions.

One object of the present invention is to decrease the cost of analysis of components within a mixture using a spectrometer.

Another object of the present invention is to provide two-dimensional mass spectroscopic information representative of one or more components within an analyte.

One advantage of the present invention is that the components of an analyte need not be separated in order to use mass spectroscopy to analyze one or more of them.

Another advantage of the present invention is that, in accordance therewith, analog or digital signal acquisition and signal processing are usable.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In accordance with the invention there is provided a method and apparatus for producing a two-dimensional mass spectrum of an analyte or components in a mixture. The method comprises the steps of generating time variant ionization of one or more components within the analyte, mass filtering or analyzing the ions generated, detecting and quantifying the mass filtered ions of the components generated as a function of time and producing output signals representative thereof; and processing the output signals to provide a two-dimensional mass spectrum representative of one or more components present within the analyte or mixture. The output processing step preferably comprises accumulating and storing the magnitudes of the ion signals or the number of ions counted for a detected ion mass during a preselected time interval, and utilizing a mathematical transform, such as a Fourier transform, to reveal the amount of information obtainable about the detected analyte or component. To reduce noise, the output processing step for each ion mass to be monitored comprises accumulating and storing the magnitudes of the ion signals during a preselected time interval preferably for a selected number of such time intervals, and determining the average ion signal per such time interval to provide a raw averaged waveform therefor. A mathematical transform, preferably a Fourier transform, is applied to the raw averaged ion signals to increase the amount of information available therefrom. The data are then analyzed, such as by comparison to reference data from a two-dimensional mass spectral data base. The data are preferably analyzed using a matrix inversion or matrix multiplication step to determine the amounts of known reference material present in the detected analyte components.

The invention further comprises an apparatus for producing a two-dimensional mass spectrum of an analyte. The apparatus comprises a structure for generating time variant ionization of components of the analyte, structure for mass filtering the ions generated or otherwise dispersing the ions according to mass, structure for detecting and quantifying the ions generated as a function of time and for producing an output representative thereof, and structure for processing the output to provide a two-dimensional mass spectrum representative of one or more components present within the analyte. The ion generating structure is capable of generating ions in accordance with a time variant signal having a preselected waveform such as sinusoidal signal. The ion generating structure can comprise, for example, an electron impact ionizer, a photoionization device, a secondary ionization device, a fast atom bombardment ionization device, a field ionization device or a surface ionization device. The ion dispersing device preferably comprises means for mass filtering ions generated by the ion generating device to provide selected ions for the ion detection and quantifying structure. The ion dispersing device can comprise, for example, a quadrupole mass filter, a magnetic sector mass filter, an electric sector mass filter, or a time-of-flight mass analyzer. The output processing structure is preferably capable of accumulating and storing the magnitude of the ion signal measured or the number of ions counted for a selected ion mass or detected component during a preselected time interval and preferably uses a mathematical transform, such as a Fourier transform, to reveal the amount of information obtainable about the detected analyte component. To reduce noise, the output processing structure is preferably capable of accumulating and storing the magnitudes of the ion signals during a preselected time interval for a selected number of such time intervals for each ion mass or analyte component to be monitored, and of determining the average ion signal magnitude for such time interval to provide the raw averaged waveform therefor. The apparatus preferably further comprises means for applying the aforementioned mathematical transform, such as a Fourier transform, to the raw averaged component waveforms of the selected ion masses or detected analyte components to be monitored to reveal the amount of information obtainable therefor and to provide two-dimensional mass spectral data related to the detected analyte or mixture components. The apparatus preferably further comprises structure for analyzing the data, for comparing it to reference data from a two-dimensional mass spectral data base, and for using a matrix inversion or multiplication to determine the amounts of known reference material present in the detected mixture components.

BRIEF DESCRIPTION OF THE DRAWINGS

The accompanying drawings, which are incorporated into and form a part of the specification, illustrate several embodiments of the present invention and, together with the description, serve to explain the principles of the invention.

DETAILED DESCRIPTION OF A PREFERRED EMBODIMENT OF THE INVENTION

The method and apparatus of the invention increase the amount of analytically useful information that can be obtained from instrumentation that employs the formation and detection of positive or negative ions for chemical or physical analysis. The invention can utilize any type of ionization source in which measured or prescribed changes in ionization source conditions lead to reproducible, non-linear changes in the quantity and/or distribution of ions produced from one or more analytes. This change is most effective when the source of ionization energy is varied across the threshold region for ionization of the species in question, thus producing large changes in ion yield over a small energy increment. However, the viability and application of the invention is not limited to this threshold region. The changes in ion abundances are quantified by converting the measured changes from the time domain to the frequency domain, the conversion being accomplished using either analog electronic circuitry or digital computer processing utilizing mathematical transforms, such as Fourier transforms. When practicing the invention, using a mass spectrometer, a unique two-dimensional spectrum is generated in which the recorded signal magnitudes or intensities are a function of both mass and modulation response frequency. The two-dimensional spectrum contains more and different chemically relevant information than is available using prior art devices and methods.

For example, the preferred embodiment uses periodic sinusoidal modulation of the electron energy of an electron impact ionization source in a mass spectrometer. Modulation conditions are chosen such that the threshold for ionization of at least one species in the analyte falls within the bounds of the modulated electron energy. The ion signal at each mass appears as a waveform, in time, that is Fourier transformed to produce a measure of intensities as a function of frequency with the intensities characteristic of the analyte at that mass. Each mass signal is similarly measured to produce a two-dimensional spectrum of the analyte.

Figure 1:
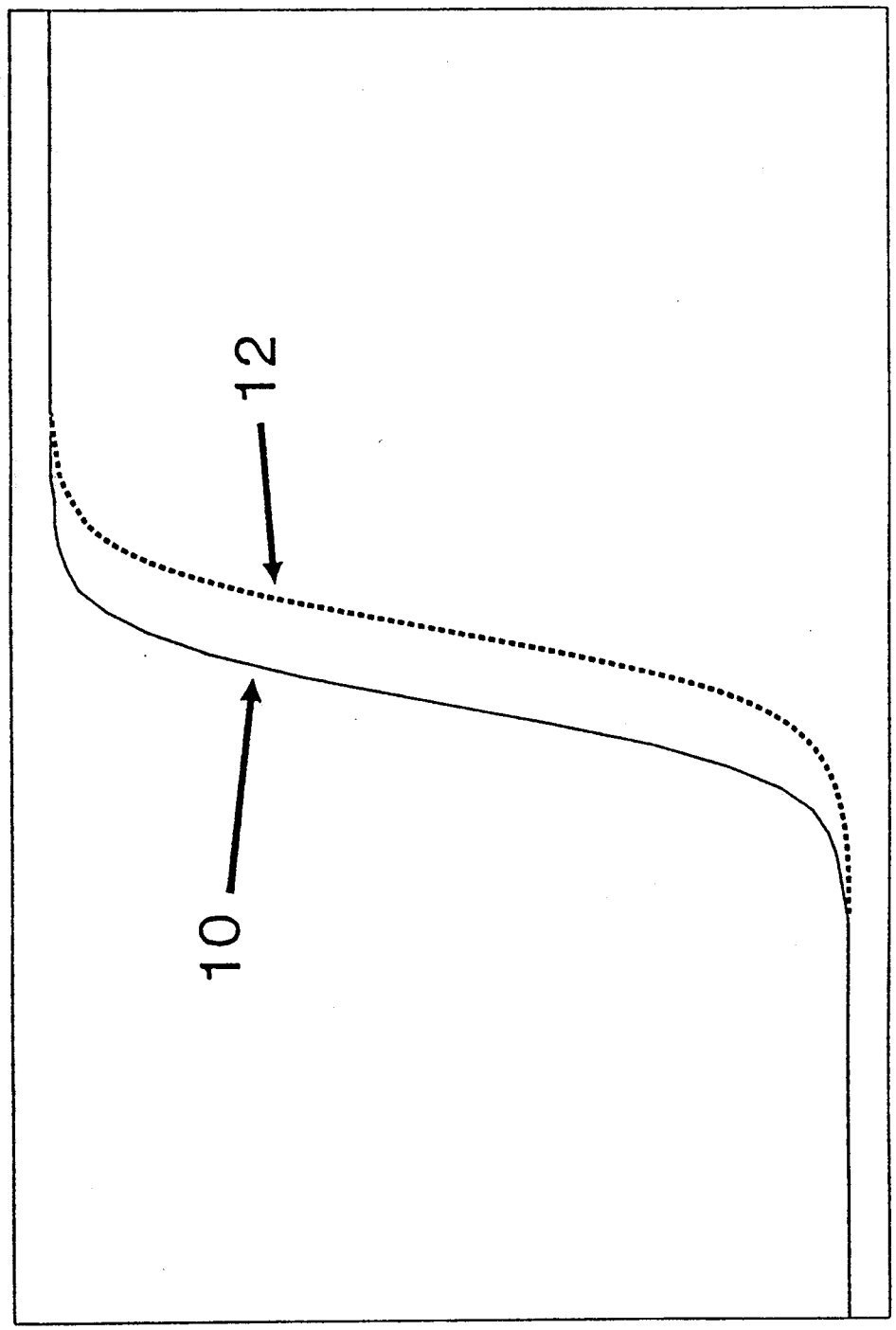
FIG. 1 shows model data representing the change in ion yield as a function of change in ionization energy for two similar substances.
Figure 2:
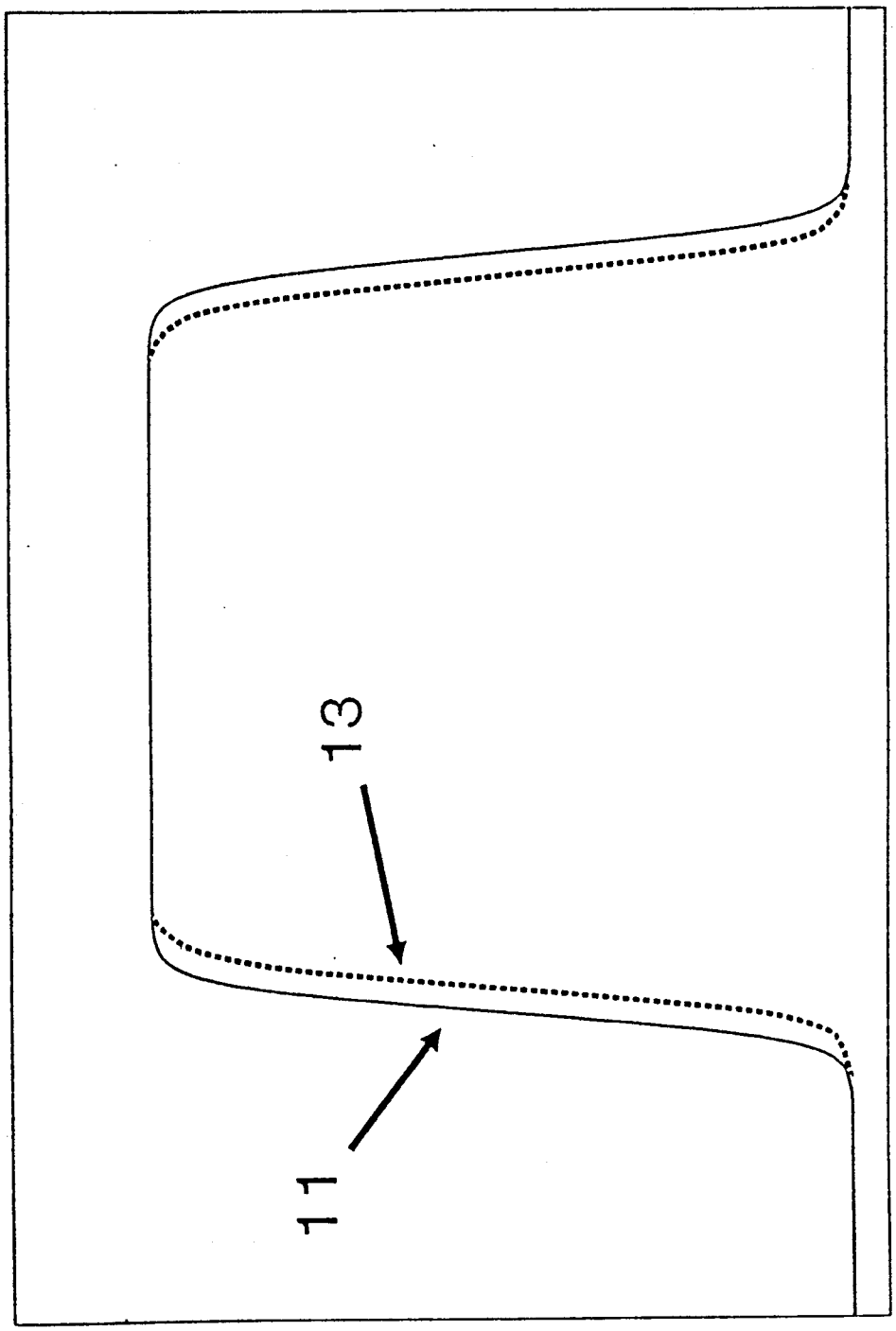
FIG. 2 illustrates model waveforms for the two similar substances of FIG. 1 with ion intensity as a function of time generated when the ionization energy is varied sinusoidally between the lower and upper limits of the abscissa of FIG. 1.
Figure 3:
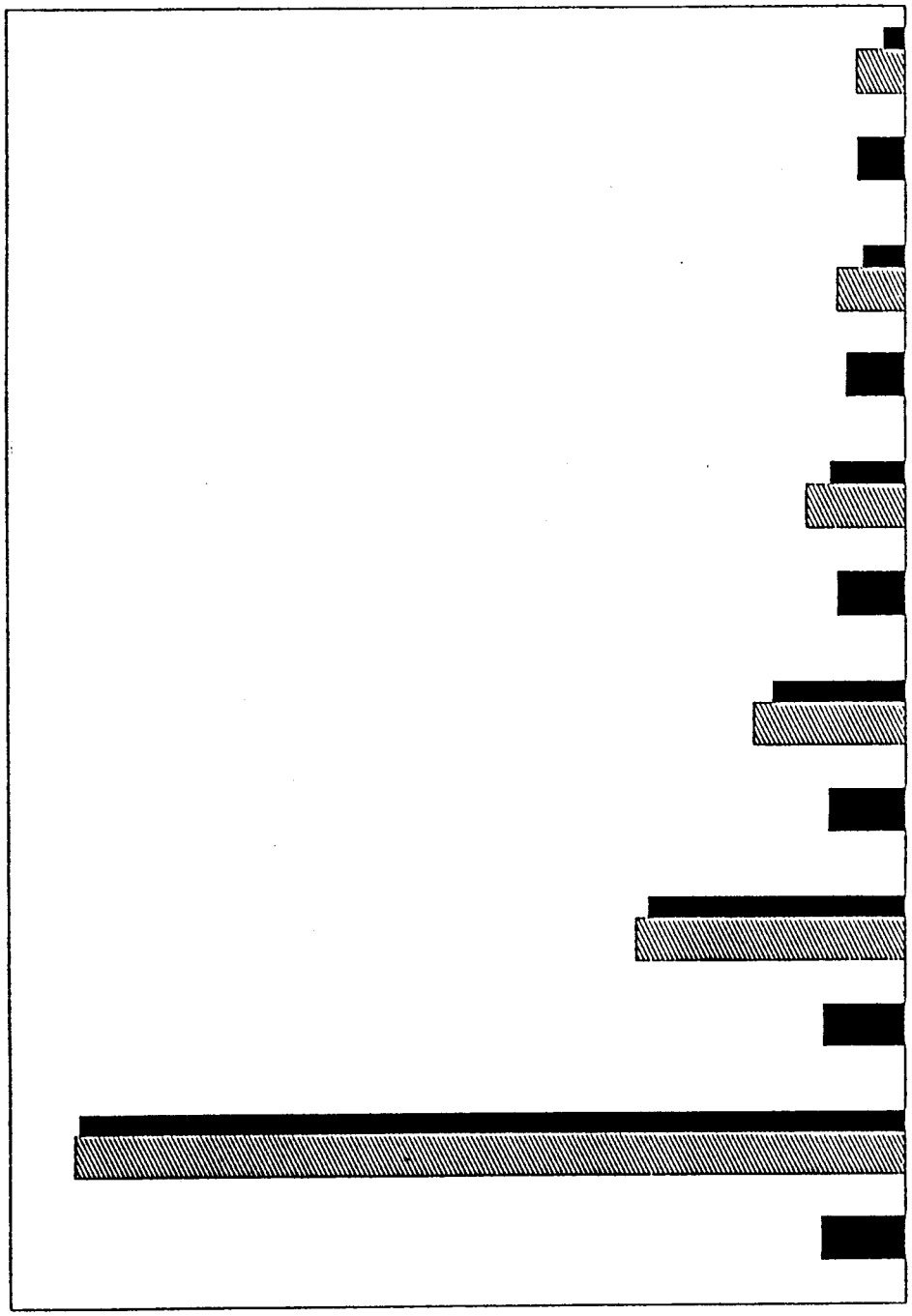
FIG. 3 depicts the low frequency portion of the Fast Fourier Transformation of the FIG. 2 waveforms with the real and imaginary parts of the transform summed in quadrature.

Reference is now made to FIGS. 1-3, FIG. 1 showing model data representing change in ion yield as a function of changing ionization energy for two similar substances. As seen therein, curves 10 and 12 have the same shape and differ only in the onset for ionization by about 0.5 electron volts. The FIG. 1 case represents a situation in which ionization energy varies by a total of about 10 electron volts, starting at a voltage below the ionization threshold for either material where the ion yield is zero, to energies significantly above the ionization threshold for both materials. In FIG. 2, the ionization thresholds for the two curves 11 and 13 differ by only 0.5 electron volts. The FIG. 2 model waveforms, which represent ion intensity as a function of time, were generated when the ionization energy was varied sinusoidally between the lower and upper limits of the abscissa of FIG. 1. FIG. 3 illustrates the low frequency portions of the Fast Fourier Transformation of the waveforms in FIG. 2, the Fourier transforms providing a simpler mechanism to characterize the waveforms and thereby reveal the information available, including differences between the two waveforms, than does either representation of FIGS. 1 and 2. In FIG. 3, the real and imaginary parts of each transform have been summed in quadrature, to provide a more readable figure.

Figure 4:
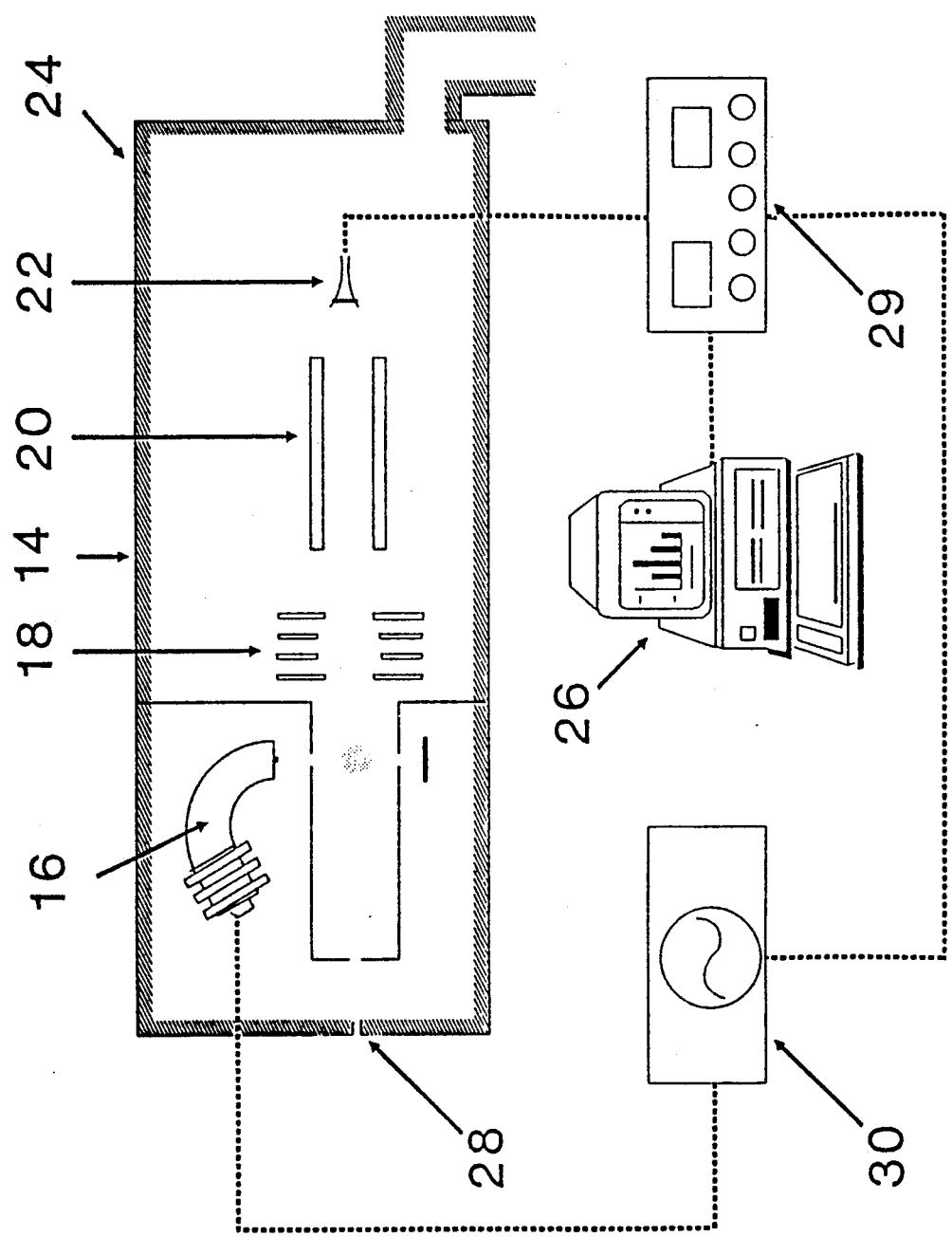
FIG. 4 illustrates a preferred embodiment of the invention utilizing a mass filter.

Reference is now made to FIG. 4 which illustrates a preferred embodiment of the invention 14, comprising an electron impact ionizer 16, ion focusing optics 18, a quadrupole mass filter 20, and an ion multiplier type of ion detector 22 operating in ion counting mode. The mass spectrometer 14 and the other aforementioned components are positioned within a differentially pumped vacuum enclosure 24, which is maintainable at pressures below $\sim 5 \times 10^{-6}$ torr, and is equipped with an aperture 28 for introducing gaseous samples to the ionizer 16. The mass spectrometer 14 is controlled by a microcomputer 26, such as an IBM compatible microcomputer equipped with an Intel Corporation 80386/80387 microprocessor/math co-processor pair operating at 25 MHz, or the like. As will be appreciated by those skilled in the art, the computer is easily programmed to control the mass spectrometer and the other components of the preferred embodiment. The scanned mass range in the preferred embodiment runs from 12 to 212 daltons (atomic mass units) and the mass resolution is adjustable such that, for each nominal ion mass, selected ions of that nominal mass form the overwhelming majority of ions transmitted to the detector.

Electron energy is modulatable by a sinusoidal voltage generator 30 operated at 80 Hz. This frequency is significantly lower than the MHz frequency bandwidth of the ion detector 22 and ion signal measurement electronics associated therewith and guarantees that the highest response frequencies generated fall within the detection bandwidth. The range and average values of the modulation voltage are user selectable. Typically, the voltage range is about 10 volts. The upper limit to the modulated energy is chosen to exceed the threshold for ionization of at least one of the species in the analyte and would be set at a value larger than the ionization threshold for all species in the analyte which the operator desires to detect. The lower energy limit is chosen such that there is a large, non-linear difference in the yield of at least one type of ion as the electron energy varies from lower to upper limits and is below the ionization threshold for all species desired to be measured. The most general purpose settings vary the electron energy between about 6 and about 16 electron volts (eV). This range encompasses the ionization potentials of most gas phase molecular and atomic species.

The ionization energy resolution is significantly narrower than the range spanned by the applied modulation and is controlled by the electron impact ionizer 16 by means of either additional electron optics or an electron monochromator, such as Comstock model AC-901. For the typical 10 eV modulation range, a 0.1 eV bandwidth is acceptable, resulting in the analyte being subjected to approximately 100 distinct ionization energies.

The ion detector 22 output inputs to a signal averager 29. Signal averager data acquisition is initiated by a signal from the electron energy modulator 30, the signal averager 29 accumulating the number of ion counts during a preselected time interval, then transferring that number of counts to its memory before accumulating the number of ion counts within the next time interval. One signal averager sweep can be set to contain data from 128 time intervals in using the preferred embodiment apparatus. Data acquired over several repetitions of the ionization energy modulation cycle are averaged to produce a raw waveform for each mass. The averaged waveform is then transferred to the computer 26 where it is stored as an array of ion intensities measured during discrete time intervals. The waveform, by way of its discreteness, is an approximation to the true waveform.

In the preferred embodiment, the number of points per waveform and the measurement time interval per point were chosen such that the array of recorded intensities captures faithfully the important frequency components of the actual ion signal. Standard sampling theorems impose the requirement that the measurement time per point be not more than half the period of the highest frequency present. To this end, averaging several instances of an ion signal waveform reduces the high frequency noise component. Commercially available digital or analog filtering devices are useful to remove high frequency noise.

Fourier transformation of the waveforms is accomplished using a digital computer running a computer program that implements the well-known Cooley-Tukey algorithm for Fast Fourier Transforms (FFT). This algorithm requires the array representing the waveform contain a number of points equal to an integral power of two. Given that approximately 100 distinct ionization energies are used, then 128-element arrays are appropriate with each transformation generating a function of 128 frequencies (64 discrete complex frequencies). This results in a significant increase in the amount of information obtained at each ion mass, and the complete mass spectrum is two-dimensional as each tabulated intensity is a function of both mass and frequency.

Another commercially available computer program uses the acquired two-dimensional mass spectrum plus data from a two-dimensional mass spectral data base to determine the amounts of known reference materials present in the analyte. The two-dimensional mass spectrum is cast as a long one-dimensional vector, b, in which the first 128 elements are the intensities at the first mass of the characteristic frequencies, the next 128 elements are the intensities at the second mass of the characteristic frequencies, and so on. The desired results, the mole fractions, or concentrations, of each reference material occurring in the analyte, comprise the vector x. Vector x is calculated by $$x = D \cdot b$$

in which $A^{-1}$, a rectangular matrix, satisfies $A \cdot D \cdot A = 1$, where 1 is the unit matrix. The rows of the rectangular matrix A comprise the two-dimensional spectra of the reference materials recorded under the same modulation conditions used to acquire the two-dimensional mass spectrum of the analyte. Generalized Matrix inversion, that is, calculation of D from A, need be performed only when the mass spectral data base is first assembled or is updated. That calculation is accomplished using a commercially available computer program implementing the singular valued decomposition method or similar appropriate technique.

Calculating D from A, is the only computationally intensive step in the computerized mass spectral mixture analysis; but this step needs to be performed only occasionally. The remainder of the operations are sufficiently rapid that an entire 200-dalton, two-dimensional mass spectrum can be acquired, the individual waveforms Fourier transformed, and the deconvolution calculation performed in five minutes. Eighty percent of the time is devoted to data acquisition, allowing 1.25 seconds of signal averaging at each mass, 100 modulation cycles at 80 Hz, while fast Fourier transformation of two hundred 128-point waveforms takes only about 6 seconds and the subsequent matrix multiplication step takes about 50 seconds. Since many ion masses do not correspond to feasible ions derived from ionization of the analyte, if desired, those masses can be deleted from the data acquisition step and from the data base, significantly reducing analysis time.

Figure 5:
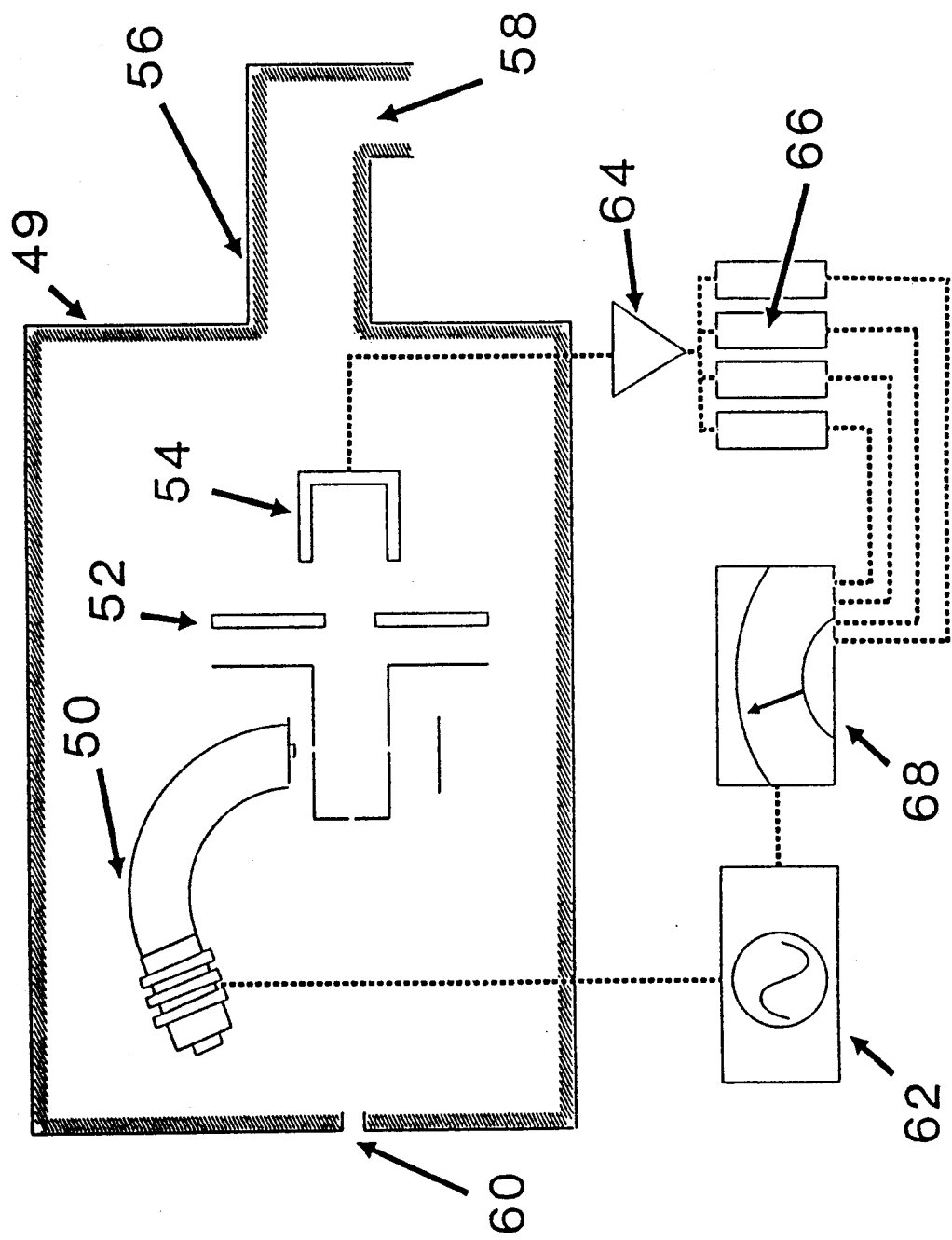
FIG. 5 illustrates an embodiment of the invention without a mass filter, useful where the analyte can be sufficiently well characterized by its ionization modulation response alone, such as in a leak detector.

Reference is now made to FIG. 5, which shows an alternate embodiment of the invention which does not utilize a mass filter and which is particularly suitable for use where an analyte can be sufficiently well characterized by its ionization modulation response alone. An exemplary use is that of a leak detector. As seen in FIG. 5, the apparatus 49 comprises an electron impact ionizer 50, an ion extractor 52, and a Faraday-cup-type ion collector 54. These components are contained in a vacuum enclosure 56 maintained at pressures no higher than $1 \times 10^{-3}$ torr by a vacuum pump 58 and connected to the apparatus being checked for leaks through an aperture 60. The energy of the electrons is modulated by a sinusoidal voltage generator 62. The range of electron energies brackets the threshold for ionization of helium gas, 24.6 eV. The current measured by the Faraday-cup-detector is converted to a voltage 64 which is applied to a plurality of selected bandpass filters 66. The center frequencies of the bandpass filters are each selected to correspond to one of the major Fourier components exhibited by ionization of helium at the ionization modulation frequency. The selected frequencies are chosen not to include the major Fourier components of other gases normally found in air or the test environment. Such gases comprise nitrogen, oxygen, water, carbon dioxide, argon and light hydrocarbons. A multiplexed voltmeter 68 measures the magnitudes of the voltages transmitted by the bandpass filters and, through the use of a previously acquired calibration, the voltage measurements are combined in a manner to indicate the amount of helium present in the leak detector.

In practicing the invention the sweep frequency, waveform shape, number of scans and number of bands are all variable and selectable. Analog or digital signal acquisition and analog or digital signal processing are all usable and the computer can also act as an averager, if desired. The analyte can comprise a mixture having two or more components or a pure substance.

The invention is not limited to instruments using electron impact ionizers and is applicable to any system in which changes to the performance of an ionizer are readily controlled or readily quantified and in which such changes provide measurable, non-linear changes in the quantity and/or distribution of ion abundances. In practicing the invention, other ionization devices such as photoionization sources equipped with variable wavelength light sources, such as tunable lasers, synchrotron light sources and broadband lamps plus monochromators; secondary ionization sources in which the ion beam energy or species content is varied; fast atom bombardment ionization in which the atom kinetic energy or species content is varied; field ionization in which the applied electrical potential is varied; and surface ionization in which the active surface temperature is varied can all be used.

The invention has been described in detail with particular reference to two embodiments thereof, but it will be understood that variations and modifications can be effected within the scope of the invention.

What is claimed is:

1. A method for producing a two-dimensional mass spectrum of an analyte, the method comprising the steps of:
    applying to an analyte a reproducible, progressively varying ionization energy;
    mass filtering the ions generated;
    detecting and quantifying the mass filtered ions of the components generated as a function of time and producing output signals representative thereof;
    processing the output signals to provide a two-dimensional mass spectrum representative of at least one component present within the analyte.

2. The invention of claim 1 wherein the output processing step further comprises utilizing a mathematical transform to reveal the amount of information obtainable about the detected analyte component.

3. The invention of claim 1 wherein the output processing step comprises accumulating and storing the magnitudes of the ion signals detected during a preselected time interval.

4. The invention of claim 1 wherein the output processing step comprises accumulating and storing the number of ions counted during a preselected time interval.

5. The invention of claim 1 wherein, to reduce noise, the output processing step comprises, for each ion mass to be monitored, accumulating and storing the magnitudes of the ion signals during a preselected time interval for a selected number of such time intervals and determining the average ion signal per such time interval to provide a raw averaged waveform therefor.

6. The invention of claim 5 further comprising applying a mathematical transform to the raw averaged ion signal of the detected mixture components to be monitored to increase the amount of information obtainable therefor and to provide two-dimensional mass spectral data related to the detected mixture components.

7. The invention of claim 6 wherein the mathematical transform comprises a Fourier transform.

8. The invention of claim 6 further comprising analyzing the data.

9. The invention of claim 8 wherein the data are analyzed by comparing them to reference data from a two-dimensional mass spectral data base.

10. The invention of claim 9 wherein the data are analyzed using a matrix inversion step to determine the amounts of known reference material present in the detected analyte components.

11. The invention of claim 9 wherein the data are analyzed using a matrix multiplication step to determine the amounts of known reference material present in the detected analyte components.

12. A method for producing a two-dimensional mass spectrum of a plurality of components within a mixture, the method comprising the steps of:
    applying to a mixture a reproducible, progressively varying ionization energy;
    mass filtering the ions generated;
    detecting and quantifying ions of the components generated as a function of time and producing an output representative thereof; and
    processing the output to provide a two-dimensional mass spectrum representative of at least two components present within the mixture.

13. An apparatus for producing a two-dimensional mass spectrum of an analyte, the method apparatus comprising:
    means for applying to an analyte a reproducible, progressively varying ionization energy;
    means for mass filtering the ions generated;
    means for detecting and quantifying the ions generated and mass filtered as a function of time and for producing an output representative thereof; and
    means for processing the output to provide a two-dimensional mass spectrum representative of at least one component present within the analyte.

14. The invention of claim 13 wherein said ion generating means comprises means for generating ions in accordance with a time variant signal having a preselected waveform.

15. The invention of claim 13 wherein said ion generating means comprises means for generating ions in accordance with a sinusoidal signal.

16. The invention of claim 14 wherein said ion generating means is selected from the group consisting of an electron impact ionizer means, photoionization means, secondary ionization means, fast atom bombardment ionization means, field ionization means and surface ionization means.

17. The invention of claim 13 wherein said mass filtering means is selected from the group consisting of quadrupole mass filter means, magnetic sector mass filter means, electric sector mass filter means, and time-of-flight mass analyzer means.

18. The invention of claim 13 wherein said output processing means comprises means for accumulating and storing the number of ions counted for a selected ion mass during a preselected time interval.

19. The invention of claim 13 wherein said output processing means comprises means for accumulating and storing the magnitude of the ion signal measured fo a selected ion mass during a preselected time interval.

20. The invention of claim 19 wherein said output processing means further comprises means for utilizing a mathematical transform to reveal the amount of information obtainable about the detected analyte component.

21. The invention of claim 13 wherein, to reduce noise, said output processing means comprises meas for accumulating and storing the magnitudes of the ion signals during a preselected time interval for a selected number of such time intervals for each ion mass to be monitored, and means for determining the average ion signal magnitude for such time intervals to provide a raw averaged waveform therefor.

22. The invention of claim 21 further comprising means for applying a mathematical transform to the raw averaged component waveforms of the detected selected ion masses to be monitored to reveal the amount of information obtainable therefor and to provide two-dimensional mass spectral data related to the detected components.

23. The invention of claim 22 wherein said mathematical transform applying means comprises means for applying a Fourier transform.

24. The invention of claim 21 further comprising means for analyzng the data.

25. The invention of claim 24 wherein said data analyzing means comprises means for comparing analyzed data to reference data from a two-dimensional mass spectral data base.

26. The invention of claim 24 wherein said data analyzing means comprises means for using a matrix inversion to determine the amounts of known reference material present in the detected mixture components.

27. A method for producing an ion modulation response spectrum of an analyte, the method comprising the steps of:
applying to an analyte a reproducible, progressively varying ionization energy;
detecting and quantifying the ions of the components generated as a function of time and producing output signals representative thereof; and
processing the output signals to provide an ionization modulation response spectrum representative of at least one component present within the analyte.

28. The invention of claim 27 wherein the signal output processing step comprises selecting one or more pre-identified signal characteristics of the ionization modulation response spectrum and comparing the pre-identified signal characteristics with one or more pre-established reference characteristics to identify one or more components.

29. The invention of claim 28 wherein the signal characteristics selecting step comprises utilizing an analog band pass filter.

30. The invention of claim 28 wherein the signal characteristic selecting step comprises digital signal processing.

31. An apparatus for producing a two-dimensional mass spectrum of an analyte, the method comprising the steps of:
means for applying to an analyte a reproducible, progressively varying ionization energy;
means for detecting and quantifying the ions generated as a function of time and for producing an output representative thereof; and
means for processing the output to provide an ionization modulation response spectrum representative of at least one component present within the analyte.

32. The invention of claim 31 wherein said output processing means comprises means for selecting one or more pre-identified signal characteristics of the ionization modulation response spectrum and means for comparing said pre-identified signal characteristics with one or more pre-established reference characteristics to identify said one or more components.

33. The invention of claim 32 wherein said signal characteristic selecting means comprises analog band pass filter means.

34. The invention of claim 32 wherein said signal characteristic selecting means comprises digital signal processing means.

* * * * *

UNITED STATES PATENT AND TRADEMARK OFFICE
CERTIFICATE OF CORRECTION

PATENT NO. : 5,015,848

DATED : May 14, 1991

INVENTOR(S) : David S. Bomse, et al.

It is certified that error appears in the above-identified patent and that said Letters Patent is hereby corrected as shown below: On the title page:

<u>In the paragraph entitled "Inventors"</u>: Delete "Stanton: Alan C.," and substitute therefor --Alan C. Stanton;--.

<u>In the line entitled "Attorney, Agent or Firm"</u>: Delete "William A. Elkund" and substitute therefor --William A. Eklund--.

At column 1, line 1, add the following paragraph and heading:

--<u>GOVERNMENT RIGHTS</u>

The U.S. Government has a paid-up license in this invention and the right in limited circumstances to require the patent owner to license others on reasonable terms as provided for by the terms of Contract Nos. DE-FG03-90ER80988 and DE-FG03-90ER80989 awarded by the Department of Energy.--

At column 3, line 37, add: --mass-- before the word "spectrometer".

At column 8, line 12, delete "$A^{-1}$" and substitute therefor --D--.

At column 8, line 12, delete "$A \cdot D \cdot A = 1$" and substitute therefor --$A \cdot D = 1$--.

At column 8, line 17, delete "Matrix" and substitute therefor --matrix--.

At column 8, line 24, delete the "," after "A".

<u>In the Claims</u>:

At column 9, line 68, delete "signal" and substitute therefor --signals--.

UNITED STATES PATENT AND TRADEMARK OFFICE
CERTIFICATE OF CORRECTION

PATENT NO. : 5,015,848

DATED : May 14, 1991

INVENTOR(S) : David S. Bomse, et al.

It is certified that error appears in the above-identified patent and that said Letters Patent is hereby corrected as shown below:

At column 10, line 26, add --and filtered-- after the word "generated".

At column 10, line 32, delete "method".

At column 10, line 67, delete "fo" and substitute therefor --for--.

At column 11, line 7, delete "meas" and substitute therefor --means--.

At column 11, line 26, delete "analyzng" and substitute therefor --analyzing--.

At column 11, line 35, delete "ion" and substitute therefor --ionization--.

At column 12, line 12, delete "characteristics" and substitute therefor --characteristic--.

At column 12, line 17, delete "a two-dimensional mass" and substitute therefor --an ionization modulation response--.

Signed and Sealed this

Seventeenth Day of November, 1992

Attest:

DOUGLAS B. COMER

Attesting Officer

Acting Commissioner of Patents and Trademarks